(12) United States Patent
Martins

(10) Patent No.: US 7,777,442 B2
(45) Date of Patent: Aug. 17, 2010

(54) METHOD OF CONTROLLING THE SPEED OF AN ELECTRIC MOTOR

(75) Inventor: Andre Luis Martins, Sao Carlos -SP (BR)

(73) Assignee: Whirlpool S.A., Sao Paulo - SP (BR)

( * ) Notice: Subject to any disclaimer, the term of this patent is extended or adjusted under 35 U.S.C. 154(b) by 511 days.

(21) Appl. No.: 10/598,526

(22) PCT Filed: Sep. 21, 2005

(86) PCT No.: PCT/BR2005/000198

§ 371 (c)(1),
(2), (4) Date: Oct. 20, 2006

(87) PCT Pub. No.: WO2006/032121

PCT Pub. Date: Mar. 30, 2006

(65) Prior Publication Data

US 2007/0170879 A1    Jul. 26, 2007

(30) Foreign Application Priority Data

Sep. 22, 2004   (BR) ................................. 0404081

(51) Int. Cl.
    *H02P 23/00* (2006.01)
(52) U.S. Cl. .................. 318/799; 318/727; 318/779
(58) Field of Classification Search .............. 318/280,
        318/400.01, 430, 567, 632, 799, 800, 801,
        318/244, 254.1, 257, 263, 268, 727, 779,
                                          318/807, 823, 825
    See application file for complete search history.

(56) References Cited

U.S. PATENT DOCUMENTS

| | | | | |
|---|---|---|---|---|
| 3,935,522 A | * | 1/1976 | Tsay | 388/830 |
| 4,065,703 A | * | 12/1977 | Schlicher et al. | 318/711 |
| 4,307,325 A | * | 12/1981 | Saar | 388/809 |
| 4,409,532 A | * | 10/1983 | Hollenbeck et al. | 318/749 |
| 4,605,883 A | * | 8/1986 | Cockroft | 388/815 |
| 4,823,067 A | * | 4/1989 | Weber | 318/799 |
| 4,935,678 A | * | 6/1990 | Houst | 318/268 |
| 4,972,134 A | * | 11/1990 | Getz et al. | 318/817 |

(Continued)

*Primary Examiner*—Bentsu Ro
*Assistant Examiner*—Antony M Paul
(74) *Attorney, Agent, or Firm*—Brian J. Colandreo, Esq.; Holland & Knight LLP

(57) ABSTRACT

A method of controlling the speed of an electric motor, said method being a digital method designed to control the speed of an induction motor that is powered by a triac device to a preset speed, in which the speed of the motor is measured and a digital numerical value representative of the mathematical first derivative of motor speed is calculated. A determination is made of the digital numerical value of the motor speed first derivative relative to a range, or band, of values. An error signal also is computed that is proportional to the error between the measured current motor speed and the preset speed and a determination is made of the digital numerical value of this error signal relative to a range, or band, of values that includes a value corresponding to that of the motor operating at the preset speed. If the value of each of the two signals is within its respective band, then the two numerical values are added to produce a total error signal whose value is then converted to a signal to a signal to correct the triac triggering angle to that needed to obtain the preset motor speed.

9 Claims, 4 Drawing Sheets

U.S. PATENT DOCUMENTS

| | | | |
|---|---|---|---|
| 5,008,608 A * | 4/1991 | Unsworth et al. | 318/729 |
| 5,380,086 A * | 1/1995 | Dickson | 366/97 |
| 5,847,526 A * | 12/1998 | Lasko et al. | 318/471 |
| 6,313,601 B1 * | 11/2001 | Kubo et al. | 318/799 |
| 6,614,197 B2 * | 9/2003 | Berringer | 318/245 |
| 6,633,149 B1 * | 10/2003 | Foureys | 318/567 |
| 7,191,484 B2 * | 3/2007 | Dawe | 8/158 |

* cited by examiner

METHOD OF CONTROLLING THE SPEED OF AN ELECTRIC MOTOR

CROSS-REFERENCE TO PRIOR APPLICATION

This is a U.S. National Phase Application under 35 U.S.C. §371 of International Patent Application No. PCT/BR2005/000198, Sep. 9, 2005, and claims priority of Brazilian Patent Application No. PI 0404081-3, filed Sep. 22, 2004, both of which are incorporated by reference herein. The International Application was published in English on Mar. 30, 2006 as WO 2006/032121 A1 under PCT Article 21(2).

FIELD OF THE INVENTION

The invention relates to a method of controlling the speed of an electric motor that is powered by a semiconductor device of the triac type, by controlling the angle of the triggering signal applied to the triac.

BACKGROUND OF THE INVENTION

Induction motors are single-phase motors with a series excitation commutator and are frequently used in the field of domestic electrical appliances, for example for driving the rotating drum of a clothes washing or drying machine. Such motors are often powered by a semiconductor triac device. It is often desired to control the speed of such a motor to increase the efficiency of its operation.

Known methods for controlling the speed of rotation of a universal motor use a tachometric generator coupled to the motor to supply an output electrical signal that is representative of the motor speed and a triac, whose triggering angle determines the RMS (root mean square) voltage applied to the motor windings. Digital control methods are used to control the motor speed based on the principal that a triggering angle difference of the triac is proportional to the motor speed difference.

One such control method is disclosed in U.S. Pat. No. 6,633,149 in which a method for digital control of a universal motor, in particular for electrical household appliances, measures the motor rotation speed, determines the difference between the measured speed and a preset (desired) speed, and controls the motor on the basis of this difference. This method further estimates at least one of the values of the resisting torque of the motor and the current in the motor windings. While such a method is useful, it is relatively complicated to implement particularly in household appliances, such as a laundry machine, where reduced cost is a paramount goal. Accordingly, a need exists for a method of controlling the speed of a motor powered by a triac that is easy to perform and relatively inexpensive to implement.

SUMMARY OF THE INVENTION

In accordance with the invention, a novel method is provided for controlling the speed of a motor that is powered by a triac device to achieve a desired preset speed. According to the invention, a digital method is provided in which the speed of the motor is measured and a signal is produced from which a digital numerical value representative of the mathematical first derivative of motor speed is derived. A determination is made of the digital numerical value of the motor speed derivative relative to a range, or band, of values of the motor speed derivative. An error signal is also computed that is proportional to the error between the measured current motor speed and the preset speed. A determination is made of the digital numerical value of the motor speed error signal relative to a range, or band, of values that includes a value corresponding to that of the motor operating at the preset speed.

If the value of the motor speed derivative related signal or motor speed error signal is outside of the value of its respective range or band, which corresponds to an unrealistic value of motor speed, then the microprocessor program forces the value to zero. This avoids making a motor speed correction of an unrealistic value. Therefore, the motor speed error to be corrected to achieve the preset speed will always be in a range of realistic values.

If the value of each of the two signals is within its respective range or band, then the two numerical values are added to produce a total error signal whose value is then converted to a signal to correct the triac triggering angle to that needed to obtain the preset motor speed. Provisions also are made to prevent over control of the triac triggering angle so that it will not become unstable.

BRIEF DESCRIPTION OF THE DRAWINGS

Other objects and advantages of the present invention will become more apparent upon reference to the following description and annexed drawings, in which.

DETAILED DESCRIPTION OF THE INVENTION

Figure 1:
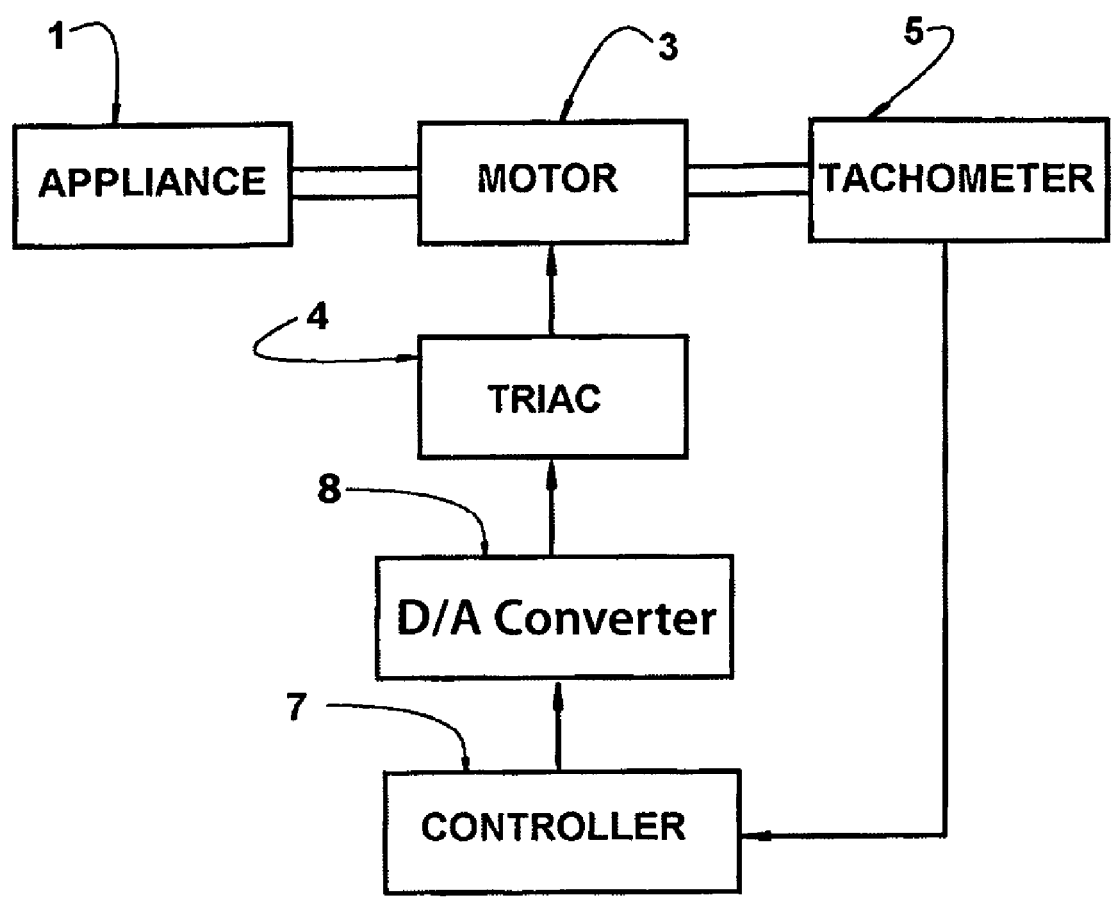
FIG. 1 is a schematic block diagram showing an application of the present invention.

FIG. 1 shows a device 1, such as the rotating tub of a household appliance washing machine that is rotated by an electric motor 3. Motor 3 is powered by a conventional triac semiconductor device 4 that operates from a suitable power supply (not shown). In such triac devices, a triggering signal is applied to its gate electrode. The electrical angle, or time, of application of the triggering signal controls the triac conduction time and thereby its output power which in turn controls the speed of motor 3. All of this is well known in the art.

A tachometer 5 of a conventional construction is connected, such as to the rotating shaft of the motor 3, to measure the motor speed and produce a signal that corresponds to the current motor speed. The current motor speed signal produced by the tachometer 5 preferably is in digital form and is applied to the input of a controller 7. The controller 7 is a device, such as a conventional microprocessor, that can perform calculations and has a memory section for storing data. The controller 7 is also programmed with the necessary data, such as preset motor speed and triac triggering angle needed to achieve said preset speed, as well as instructions to perform various steps, described below, and to produce an output signal. In the present invention, the controller 7 output signal is applied to a digital to analog converter 8 that produces an electrical signal applied to the triac gate electrode to control its triggering angle.

As explained above, the speed of motor 3 is to be controlled to a preset speed by setting the electrical angle of triggering the triac 4 that supplies the electrical current to operate the motor. The control of the motor speed in accordance with the invention makes use of a range, or band, of the mathematical first derivative of the motor speed. The invention also makes use of a range, or band, of a mathematical value that is proportional to the difference, or error, between the current motor speed and the preset speed. The former range is hereafter called the Derivative Band and the latter range the Proportional Band.

Figure 2:
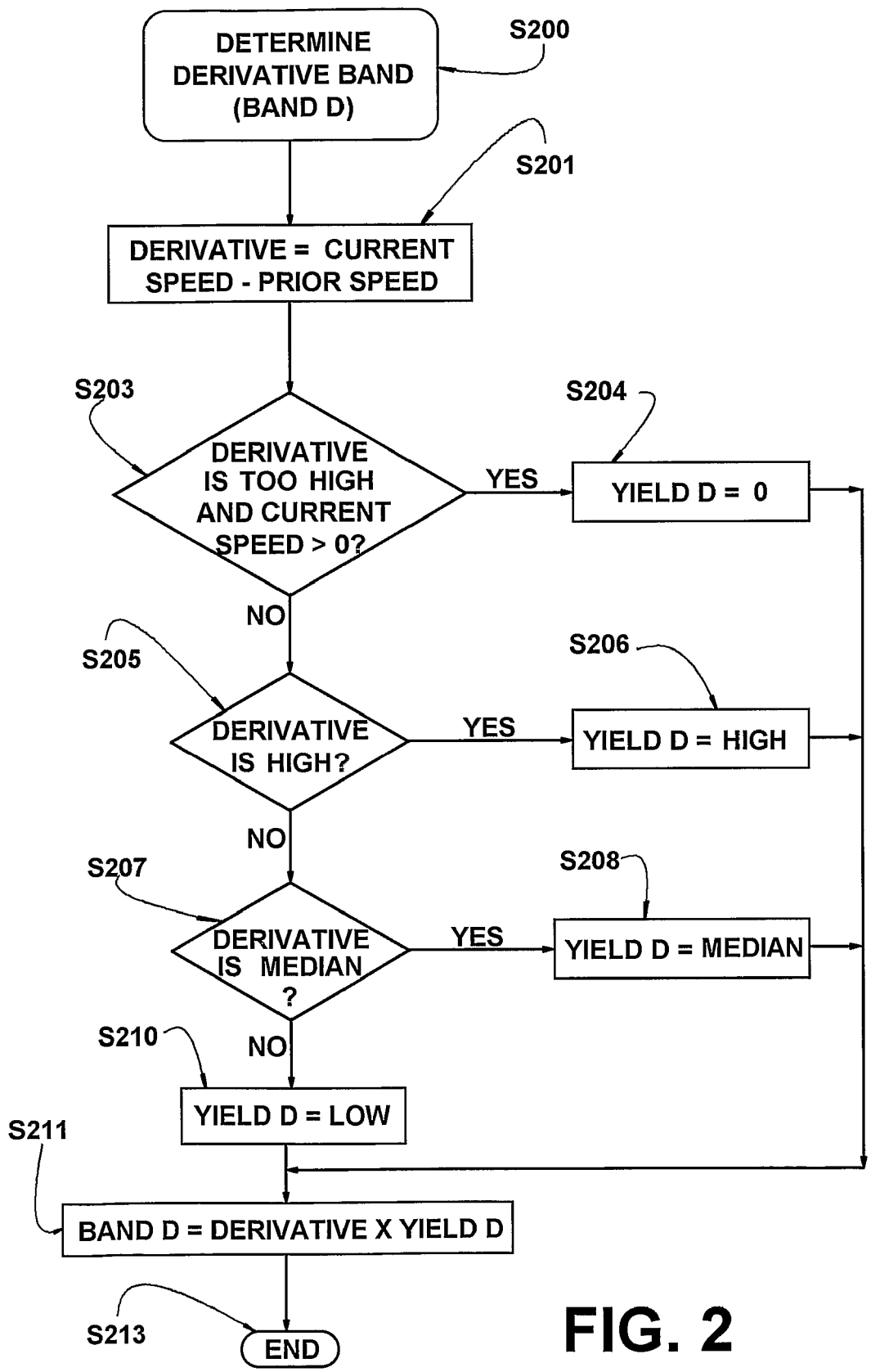
FIGS. 2 and 3 are flow charts showing the production of signals to be used in computing the triac triggering angle correction.
Figure 3:
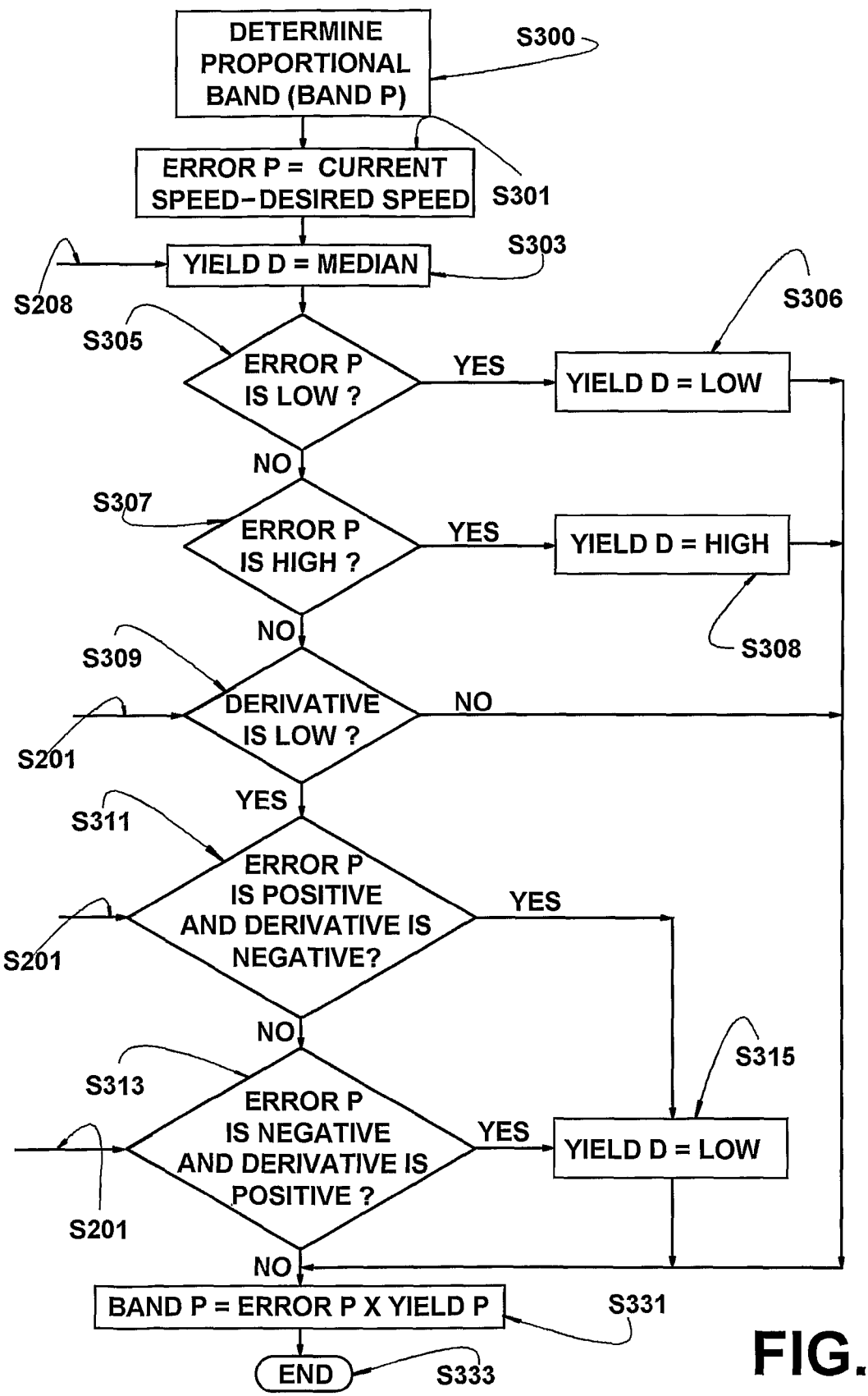

FIGS. 2 and 3 depict how the Derivative Band and Proportional Band signal values are derived by the controller 7 for use in controlling the speed of motor 3. In FIG. 2, the production S200 of the motor speed derivative signal value is described. The first step S201 is to calculate the value of the mathematical first derivative of the motor current speed, which can be expressed as ds/dt. This is calculated by the controller 7 first storing the digital value of the current motor speed measured by the tachometer 5 at one time and subtracting this value from the value of measured current motor speed. This quantity is divided by the elapsed time between the two speed measurements to produce a digital quantity corresponding to the first derivative of the motor speed.

A value, hereafter called Yield D, is next computed. This is done by comparing the motor speed derivative value determined in S201 against a range of Yield D values of the motor speed derivative that is stored in the controller 7. The Yield D values are in a range from 0 to high with a median value. These are numerical digital values stored in a table in the memory section of controller 7. In S203, the motor speed derivative value determined in S201 is compared with both the current motor speed, used in S201, and the Yield D stored range of values. In the determination in S203, if both the motor speed derivative value is higher than the stored value range and the motor current speed is greater than zero (S201), then the Yield D value is output as 0 in S204. That is, in this case the motor speed derivative is in the high end of the Band D range, but not too high, and outside of the range of being a realistic value. An S204 Yield D value of 0 is output to S211. In S211, the Band D value is calculated as:

$$\text{Band } D = \text{Derivative}(S201) \times \text{Yield } D \quad (1)$$

If both the S203 conditions are met, then the final Band D value (S211) would be zero, since the S203 output value is zero.

If the conditions of S203 are not met, then the Yield D value determination passes to S205. In S205, there is a test for a condition of the presence of a high numerical value for the motor speed derivative of S201. If this condition is met, then in S206 a digital value corresponding to Yield D=High is output to S211 for the Band D calculation of equation (1).

If neither of the S203 and S205 tests is met, then the derivative value of S201 is output to S207. If the derivative value is in the median (middle) of this stored range of values, then in S208 a digital numerical value of Yield D=Median range is output to S211 for use in the Band D calculation of equation (1). If the value of the motor speed derivative does not satisfy any of the S203, S205 and S207 conditions, then in S210 a numerical digital value of Yield D=Low is passed to S211 for the Band D calculation. The calculation of the Band D value in S211 is concluded using equation (1) and this digital numerical value is available in S213 to be used in a manner to be described with respect to FIG. 4.

Referring now to FIG. 3, S300 shows the determination of a Band P proportional error value that is accomplished in a manner similar to that of calculating the Band D value. In S301, an Error P is calculated as:

$$\text{Error } P = \text{Current Speed} - \text{Preset Speed} \quad (2)$$

where the current speed value is provided by the tachometer 5 and the preset speed is a value programmed in the controller 7. The controller 7 is also programmed with a table of values of a Yield P value that corresponds to the calculated values of Error P.

Determination of Yield P and the subsequent calculation of the Band P result are carried out only if the procedure of S201, S203, S205 and S207-S208 (FIG. 2) has determined that the value of Yield D is in the median value range. If this condition exists, as determined in S303, the Yield D=median value is received from S208 of FIG. 2. This means that the motor is operating at a speed at which a correction can be made to achieve the preset speed. If this motor speed prevails, then the Error P value determined in S301 is processed further. If the Yield D value is outside of the median value range, that is, Yield D is either 0, high or low, then there is no calculation of the Band P value.

The Error P value that passes in S303 is tested in S305 and S307 to determine if it is of either a low or high value. An Error P value at the low end of the range produces in S306 a Yield P=Low signal of a predetermined digital value that is applied to a Band P calculation step S331. If the S303 determination is that the Error P value is not in the low end of the error P range, then Error P is again tested in S307 to determine if it is in the high end of this range. If it is, then S308 supplies the corresponding numerical digital value of Yield P=High to the Band P calculation step S331.

If the Error P value is neither Low (S305) nor High (S307), then Error P is output to S309 which is also supplied with the motor speed derivative signal value of S201. If the value of the motor speed derivative signal is in the low part of its range, then the Error P value is passed to S311 to determine both if the value of Error P is positive and the motor speed derivative (of S201) is negative. In S309, the low numerical value of the motor speed derivative signal is set directly from the stored table referred to in FIG. 2. If in S311 the result is negative, then the Error P value is further tested in S313 to determine both if Error P (S301) is negative and the motor speed derivative (S201) is positive. A positive result of either of S311 or S313 causes a Yield P=Low numerical value to be outputted in S315 to the Band P calculation step S331. If both S311 and S313 are negative, then the Error P value is passed to S331 for the Band P calculation.

The Band P value is calculated as:

$$\text{Band } P = \text{Error } P \times \text{Yield } P \quad (3)$$

where,

Error P is produced in S301, S303, and S305, and Yield P is produced in one of S306, S308 or S315.

Figure 4:
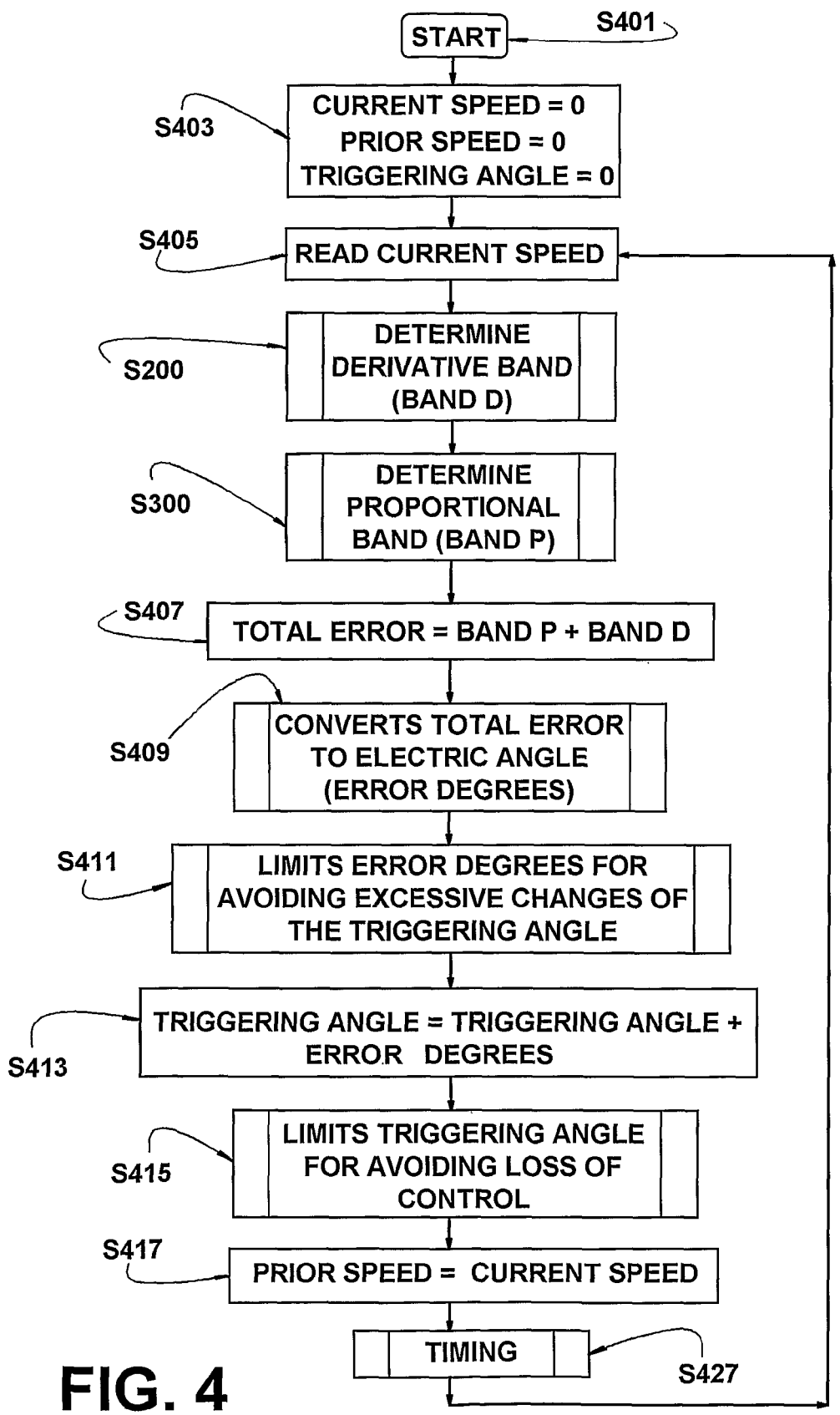
FIG. 4 is a flow chart showing the production of the signal that corrects the triac triggering angle to achieve the preset motor speed.

The calculation of the Band P value is completed in accordance with equation (3) and is available at S333. FIG. 4 shows the production of the signal used to control the triggering of the triac 4 using the Band D and Band P values of FIGS. 2 and 3 (S213 and S331). After the start in S401, the controller 7 in S403 activates its memory and calculating sections to set the current motor speed and stored value of prior speed, both measured by the tachometer 5, to zero. The electrical triggering angle of the triac 4 also is set to zero. In S405, the current motor speed value is supplied by the tachometer and this value is also supplied to S427 where calculation of the triggering angle control for the triac 4 takes place.

The determination and calculation of the Band D and Band P values described with respect to FIG. 2 (S200) and FIG. 3 (S300) takes place. These values are added in S407 to produce:

$$\text{Total Error} = \text{Band } D + \text{Band } P \quad (4)$$

The Total Error is roughly proportional to the difference that the triac 4 triggering angle deviates from the preset value needed to produce the preset motor speed. Both the Band D and Band P values are related to the difference in actual motor speed relative to the preset speed.

In S409, the Total Error value of S407 is converted to the electrical angle needed to be used to correct the triac 4 triggering angle to achieve the preset motor speed. If appropriate, the electrical degree triggering angle error value from S409 is limited in S411 to less than a preset value to prevent production of a signal that would result in excessive changes in the triac 4 triggering angle. As noted above, the controller 7 is programmed with a reference numerical digital value that corresponds to the correct triggering angle for the triac 4 to achieve the preset motor speed.

S413 performs the calculation of:

$$\text{Trig. Angle} = \text{Preset Trig. Angle} + \text{Error}(S411) \quad (5)$$

which is the final value to be used to control the triac 4 triggering angle. The digital value of the Preset Triggering Angle is programmed in the controller 7. The Triggering Angle value of S413 is limited in S415 to a value that would not cause loss of control of the triac 4.

In S417, the prior motor speed value in S201 is changed to the current speed value to be available for the next motor speed first derivative calculation in S201, also made available in S301.

The output of S413 is applied to a timing control circuit S427 which applies a digital signal to the D/A converter 8 that produces an analog signal that is applied to the triac 4 that controls its triggering angle and therefore the motor speed to obtain the preset speed.

It should be understood that the acquisition of the various data parameters, such as motor speed derivative and speed difference and calculation of the Band D, Band P and total error values can be effected as often and as many times as necessary. All of this is within the microprocessor 7 operating program, so long as it is within the operating capability of the microprocessor.

Specific features of the invention are shown in one or more of the drawings for convenience only, as each feature may be combined with other features in accordance with the invention. Alternative embodiments will be recognized by those skilled in the art and are included within the scope of the appended claims. Accordingly, the above description should be construed as illustrating and not limiting the scope of the invention and all obvious changes and modifications are to be considered within the scope of the appended claims.

The invention claimed is:

1. A method of controlling the speed of an electric motor powered by a triac to maintain a preset speed, by varying the electrical angle at which the triac is triggered, comprising the steps of:
producing a signal related to the first derivative of the motor speed;
producing a signal related to the difference in value between the motor current speed and the preset speed (Error P); and
producing a control signal based on said first derivative related signal and said Error P related signal to adjust the triac electrical triggering angle to operate the motor at the preset speed, wherein:
the step of producing said first derivative related signal further comprises the steps of
measuring the motor speed at different times and calculating the first derivative of the measured motor speed,
determining a yield value (Yield D) of the value of the first derivative from a numerical range of values, and
producing a band (Band D) value as the product of the value of said calculated first derivative and said Yield D value;
the step of producing said signal related to said Error P value further comprises the steps of:
determining a yield value (Yield P) of the Error P value from a numerical range of values, and
producing a band (Band P) value as the product of the value of said Error P signal and said Yield P value; and
the step of producing said control signal further comprises the steps of:
producing a signal of the sum of said Band D and said Band P values (Total Error), and
converting said Total Error signal into a signal which corresponds to the error of the triac electrical triggering angle needed to achieve the motor preset speed.

2. The method as claimed in claim 1, wherein the step of determining said Yield D value includes having zero, median and high values.

3. The method as claimed in claim 2, wherein in the step of determining said Yield D value which includes having zero, median and high values, the step of determining said Yield P value is carried out only if said Yield D value is of median value.

4. The method as claimed in claim 3, wherein the step of determining said Yield P value includes having values of low and high corresponding to low and high values of Error P.

5. The method as claimed in claim 4, wherein if the Yield P value in neither of low or high and the first derivative of the motor speed is of a low value, a Yield P of a low value is produced if either of the conditions of Error P being of positive sign and the first derivative of the motor speed is of negative value, or the Error P being of positive sign and the first derivative is of positive value.

6. The method as claimed in claim 4, wherein if the Yield P value is neither low or high and the first derivative of the motor speed is of a low value, no Yield P value is produced if both of the conditions exist that the Error P value is of positive sign and the first derivative of the motor speed is of negative value and Error P is of positive sign and the first derivative of the motor speed is of positive value.

7. The method as claimed in claim 1 further comprising the step of limiting the Total Error signal to limit excessive changes of the triac electrical triggering angle.

8. The method as claimed in claim 1, further comprising the step of computing the final triac electrical triggering angle by adding the triac electrical triggering angle of said Total Error to the electric triggering angle that produces the current motor speed.

9. The method as claimed in claim 8, further comprising comprises the step of limiting the final triac electrical triggering angle to avoid loss of control.

* * * * *